US007493049B1

(12) United States Patent
Conemac

(10) Patent No.: US 7,493,049 B1
(45) Date of Patent: Feb. 17, 2009

(54) AUDIO OPTIC CABLE

(76) Inventor: Donald Conemac, 29216 Mission Trial, Santa Clarita, CA (US) 91354

( * ) Notice: Subject to any disclaimer, the term of this patent is extended or adjusted under 35 U.S.C. 154(b) by 425 days.

(21) Appl. No.: 11/164,455

(22) Filed: Nov. 23, 2005

(51) Int. Cl.
*H04B 10/12* (2006.01)
*H04B 10/00* (2006.01)
*H04R 25/00* (2006.01)

(52) U.S. Cl. ................... 398/141; 398/140; 381/150; 381/172

(58) Field of Classification Search ............... 398/141, 398/140, 142, 151, 171, 182, 200; 381/150, 381/163, 172, 111, 118, 120, 121, 77; 342/53, 342/54, 57, 58, 52; 379/56.1, 56.2, 56.3, 379/68; 455/3.06, 39, 43, 19, 90.2
See application file for complete search history.

(56) References Cited

U.S. PATENT DOCUMENTS

| | | | | |
|---|---|---|---|---|
| 5,495,357 | A * | 2/1996 | Osterhout | 398/107 |
| 5,757,530 | A * | 5/1998 | Crandall, Jr. | 398/187 |
| 6,552,626 | B2 * | 4/2003 | Sharpe et al. | 333/104 |
| 6,893,346 | B2 * | 5/2005 | Small et al. | 463/40 |
| 6,931,136 | B2 * | 8/2005 | Huang | 381/77 |
| 6,965,709 | B1 * | 11/2005 | Weiss | 385/12 |
| 7,072,475 | B1 * | 7/2006 | DeNap et al. | 381/74 |

* cited by examiner

*Primary Examiner*—M. R. Sedighian
(74) *Attorney, Agent, or Firm*—Law Office of Ken Dallara; Ken Dallara

(57) ABSTRACT

An invention is disclosed whereby an analog audio signal are transmitted over distances through a flexible medium using electro-optical radiation as the carrier of the audio signal. The analog audio signal is never converted into a digital mode nor is the signal ever filtered. The resultant analog sound that is delivered to the opposite end of the flexible medium is 100% modulated with a de minimus amount of signal loss due to noise. Though the best mode of this invention is it's application to guitar cords, any form of audio analog input will function within this invention, whereby a bundle of fiber optic cables that are capable of a high amount reflectivity, with or without the presence of an element that increases or facilitates luminescence, will become saturated with light which varies in intensity with the amplitude of the sound. This invention concedes that safety is a predominant factor when associating electrical energy with those products that people can be in contact therewith. This invention uses both direct and alternating currents but does so at very low voltages. Accordingly, safety precautions for the user and for the equipment used therewith are of the utmost concern, and the circuitry designed facilitates those desires with multiple grounding means, blocking of spurious voltages, stray capacitance and electromagnetic fields and preventing induction caused by opposing voltages.

10 Claims, 6 Drawing Sheets

Figure 3

Figure 1:
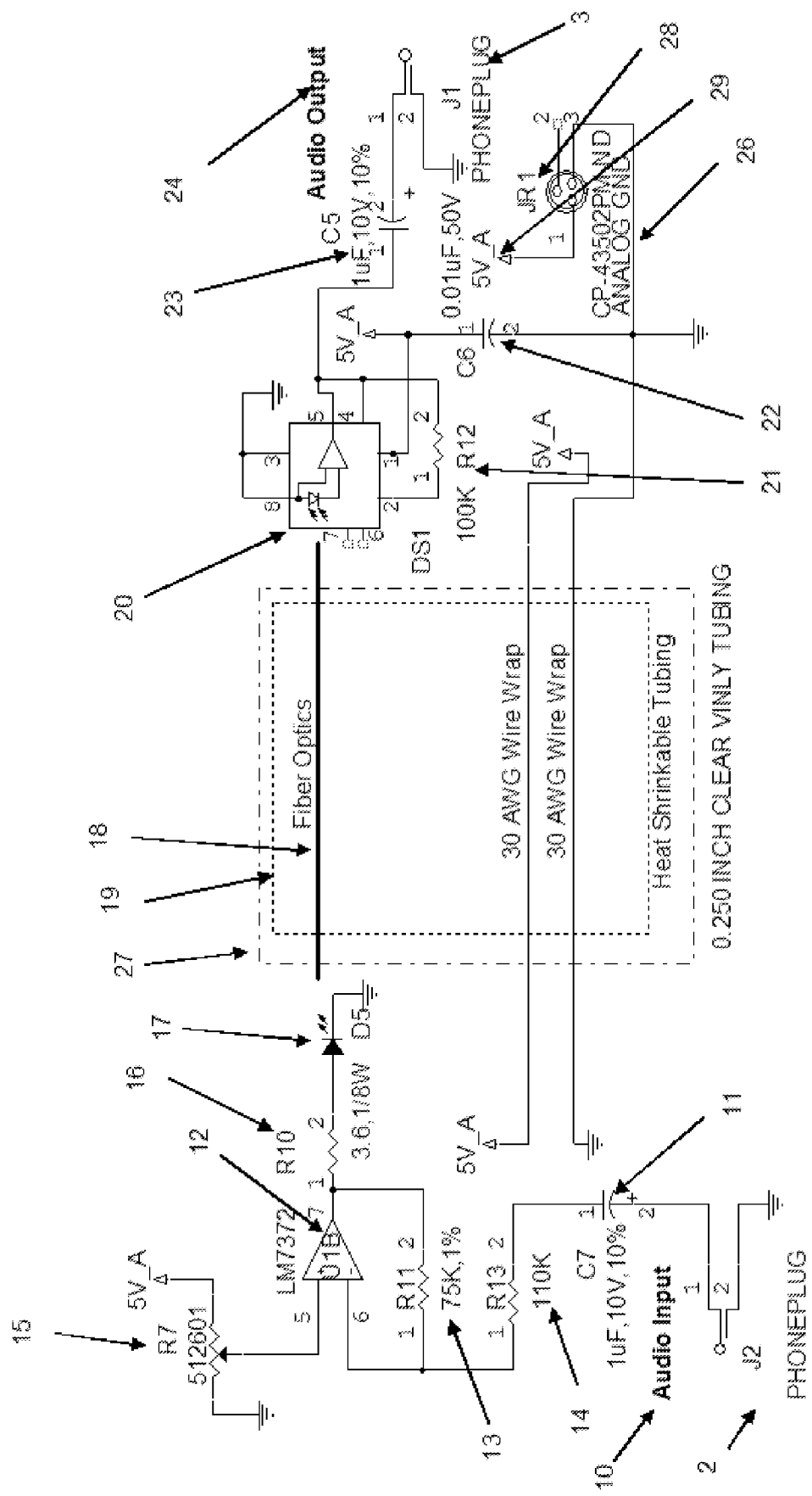

Effective use of spatial radiation pattern by
optimizing the shape of Light Emitting Diode Lens

AUDIO OPTIC CABLE

BACKGROUND OF INVENTION

The present invention concerns the field of electro-optics, whereby audio is converted into light for the purposes of transmission of analog audio signal to be processed elsewhere and where this light can also used for entertainment or informational purposes. As this invention uses light is the medium, due to its transference properties, the restrictive properties of sound through a physical medium, such as degradation through distance when using copper wires, are all but eliminated.

DESCRIPTION OF THE PRIOR ART

This invention can be practiced in many different arenas where sound can be or is converted into light energy for transmission. The best mode practiced by this invention is in the use of replacing the conventional metallic-based guitar cords that connect the electric guitar to it's amplifier, but any application where analog sound is desired to be transmitted will be adapted for use with this invention.

Prior art will enlighten the fact that transmission of sound through fiber optics is not a new concept while the mode of which the invention is practiced is novel. Prior art is replete with instances of conversion of analog to digital impulses prior to transmission through the fiber optic cable, but this invention does not convert the analog signal into a digital signal. In keeping with the analog signal, one is able to obtain full modulation of the original sound throughout the transmission process, as the sound is never converted, re-shaped or filtered whereby frequencies are removed or digitally enhanced.

There have been many applications of using light that is controlled by either the presence of sound or the frequencies or amplitude of the sound. Those applications using the presence of sound need only to refer to the "clapper" for turning lights either off or on. Low frequencies of sound were used in the original remote controls used on televisions.

Those applications were light is controlled by the frequency of the sound sample the frequency of the sound input and determine the wavelength of light to be displayed. The amplitude of the sound can also determine the intensity of the light displayed as well.

U.S. Pat. No. 5,818,342 issued to Solomon et al on Oct. 6, 1998 discloses a device that will respond in real-time to an audio signal and will change in intensity. This device uses three different DC power supplies and transformers feed by a high voltage 120VAC power source. The DC signal created by a full-wave bridge rectifier is a pulsed DC signal which in turn is used to drive the darlington driver network used to create the output for the 25 Watt 120V lamps. It is common knowledge that incandescent lamps do not shut off immediately when voltage is removed from the circuit as the coil of the lamp has to dissipate the heat in the form of light as the coil cools down. For this device to work in a real time mode, this type of lamp is not conducive the quickly changing audio signal. This device also changes the analog signal into a digital pulse waveform, whereby full modulation of the analog sound is not possibly maintained due to the speed of the digital sampling in the circuit. Digital conversion of analog sounds is also used in U.S. Pat. No. 5,402,702 issued to Hata on Apr. 4, 1995. In this patent, Hata uses LED as the light that responses to digital impulses that have been converted by a wave detecting circuit. This miniaturized circuit creates an impulse when a sound is detected of a predetermined strength. This device is limited in range of frequency to which it responds. LED's are also used in U.S. Pat. No. 5,896,457 to Tyrrel issued on Apr. 20, 1999, where analog sound from a source is processed digitally, compared to standards and reproduced through light means on a display. The purpose of this invention is to promote relaxation so 100% modulation of sound is not critical, nor is the signal ever transmitted over any distance. This device is very complex where the user selects intensity values, not using those values based on the audio signal. The current invention is not complex and is easily manufacturable, and most importantly, keeps 100% modulation of the original sound as the sound is not converted into a digital format.

Another invention that uses sound to produce color is U.S. Pat. No. 5,784,096 to Paist issued on Jul. 21, 1998, where operational amplifier are used in parallel and in series to define a value to an input signal. This value will be applied as a location on a video screen and a color of the dot in the particular location. This pattern control of sound has been widely used whereby color is determined by high speed active filter of the analog sound. The sound is filtered by separating sound frequency by a filtering series of operational amplifiers which only allow certain frequencies to proceed past the amplifier. In an embodiment to the current invention, differentiation of color by frequency is induced based on the current represented by the actual analog sound wave. This embodiment of the current invention creates a passive system where the sound wave's induction current drives the circuit rather than allowing the circuit to filter or exclude those colors that are not applicable to the particular sound wave. In the current invention, the sound wave has a particular induction current and that current is only sufficient to power certain lamps to a particular intensity. Paist sends the signal through a bank of feedback circuits which only allows certain frequencies to proceed and block the rest. This type of filtering is necessary in high speed applications, such as video games, where passive induction is more applicable to slower visual representations of analog sound waves. Paist also does not use the signal to transmit the actual sound over distances rather just uses the signal to derive a particular color spot in a particular screen location.

There is also prior art that uses fiber optic cable or fiber optic like cables to produce light. LyTec is the trademark owned by Elam Inc, described in U.S. Pat. No. 5,869,930 to Baumberg et al issued on Oct. 22, 1996, is actually a copper wire that has phosphorescent material deposited thereupon which is excited by the presence of electrical energy, producing a color representative of the amount of energy present and the type of material deposited onto the wire. The wire is encapsulated inside of a polymer jacket and uses an inverter to convert DC power to high voltage AC to power the wire. This invention provides colorful cords that can change color and are very flexible, but there since the invention uses high voltage AC, which is susceptible to moisture, there are safety issues along while the current invention uses low voltage where the presence of moisture is not a factor. The Baumberg invention is not associated with sound transmission nor it is associated with changes in intensity based on the presence of sound.

Infrared radiation has been used a medium for transmitting information or commands from one area to another. One would be remiss if one did not have at least 3 remote controls using infrared emitting diodes to control a vast array of electronic equipment. U.S. Pat. No. 5,247,580 issued to Kimura et al. on Sep. 21, 1993 shows the use of infrared light to transmit voice commands to a remote control system. The circuitry for analyzing the analog audio input and comparing the input to normal operating parameters is very common through the prior art as well as transmitting a digital signal that has been transformed from the analog input. The digital pulses are applied to a light emitting diode whose frequency range is in the infrared range. The current invention though does not convert the audio signal to digital meaning that the trueness and pureness of the analog signal is maintained. Wireless microphones by nature of the conversion process from analog to digital will not be able to modulate 100% of the analog signal input causing loss of true analog sound being produced. The present invention also has the ability to work in the visible spectrum range of wavelength, providing aesthetic as well as quality reproduction of analog sounds.

As has been shown by prior art, the concept of visual representation of analog sounds has been practiced. But prior art is devoid of using that technology to communicate over distances. Prior art is also devoid of combining visual representation of analog sounds as colors and using the energy that creates the light to transmit voltages across the transmission medium.

There are prior art applications using fiber optics to carry light impulse or a steady amount of light. There is little need to describe the entire concept of the digital fiber optic network of the phone system, suffice it to state, that high-speed digital light impulses are sent over millions of miles of fiber-optics around the world.

It would desirable to create a device whereby sound is actually transmitted using electro-optical means, whereby the quality of the transmitted sound is nearly identical as the original sound produced or input into the device. It would also be desirable to have a device which uses minimal amounts of energy to produce this high quality of sound.

It would be desirable to have a device whereby sound is transmitted in the visible spectrum whereby the user and others can enjoy a visual light representation of the sounds being created and transmitted in real time.

There is a need to be able to create a guitar cord that is not made of components such as 22 gauge solid core wire and tight plastic shells, both of which materials are prone to flexing and breakage due to the stresses of movement that a guitar cord is subjected and prevent 100% modulation of sound as resistive forces of the wire decrease sound quality over any given distance.

It would be desirable to create a guitar cord where there is actually voltage gain rather than a decrease in voltage gain over distance as with existing wire based guitar cords as resistance increases with distance traveled.

It would be desirable to create a device whereby low voltage is used through the device promoting the highest level of safety for both the user and the delicate electronic components. It would be desirable to have the device shield the attached electronic producers and reproducers of the analog signal from stray or reversing current that would cause irreparable harm.

DESCRIPTION OF ILLUSTRATIONS

In FIG. 1, a basic schematic for the audio only is detailed.

Figure 2:
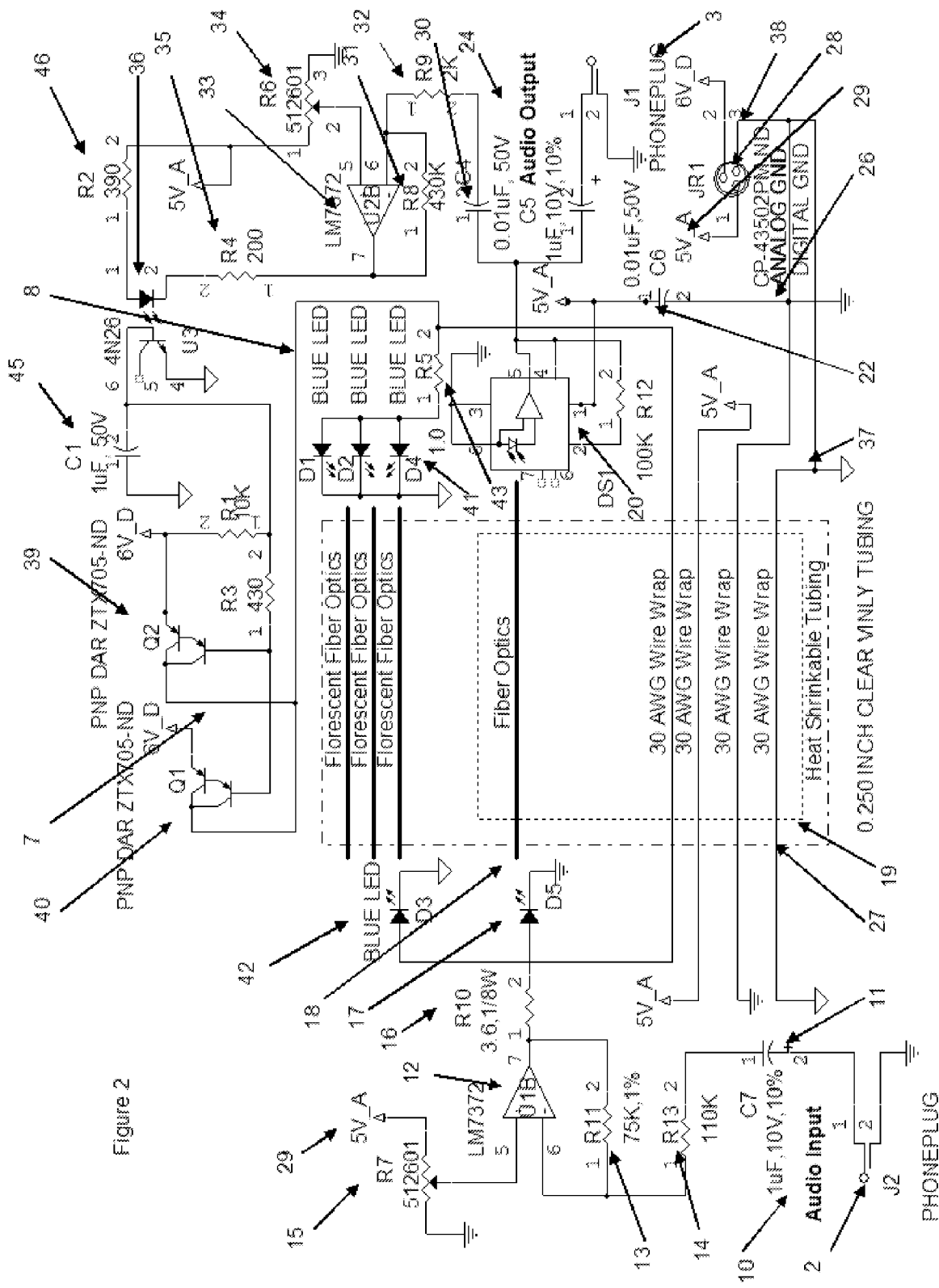

In FIG. 2, a schematic with a monochromatic bounce circuit is detailed. In this example a blue fiber optic cable and blue light emitting diodes are must by example, as any color of light emitting diode or fiber optic cable can be used as described.

Figure 3:
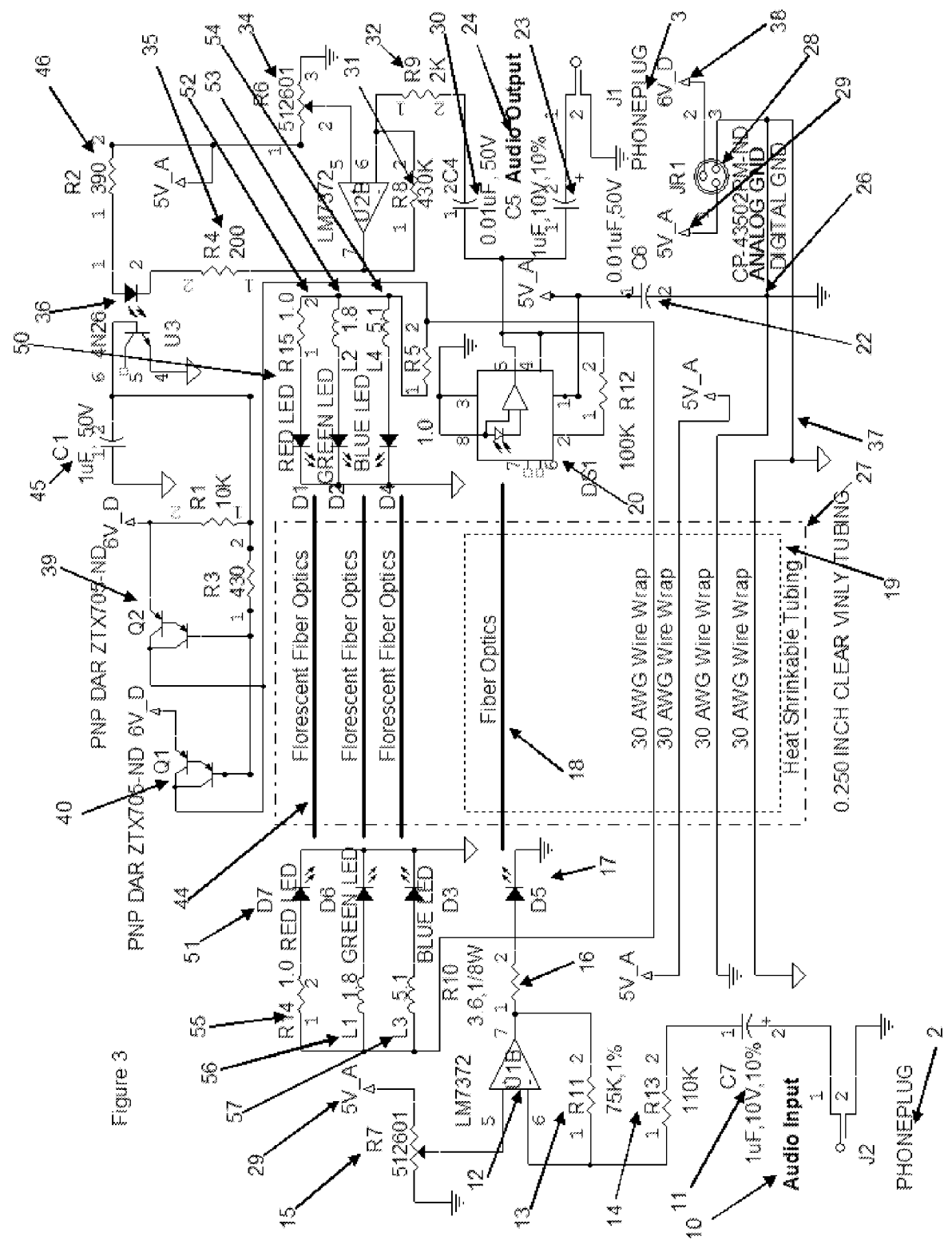

In FIG. 3, a schematic with a trichromatic bounce circuit is detailed.

Figure 4:
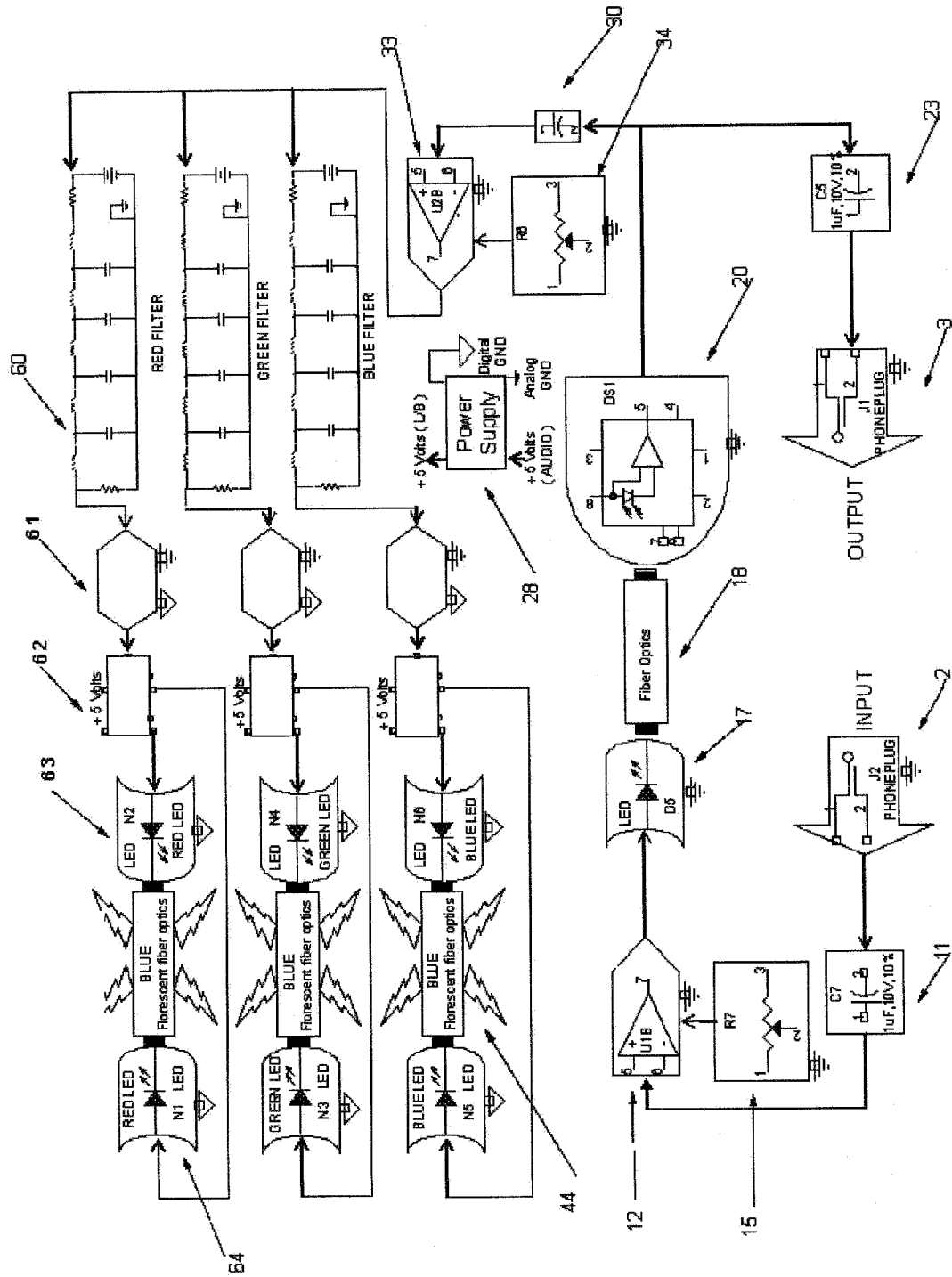

In FIG. 4, a schematic of a bounce circuit is shown where an induction circuit is used to select those colors to be displayed.

Figure 5:
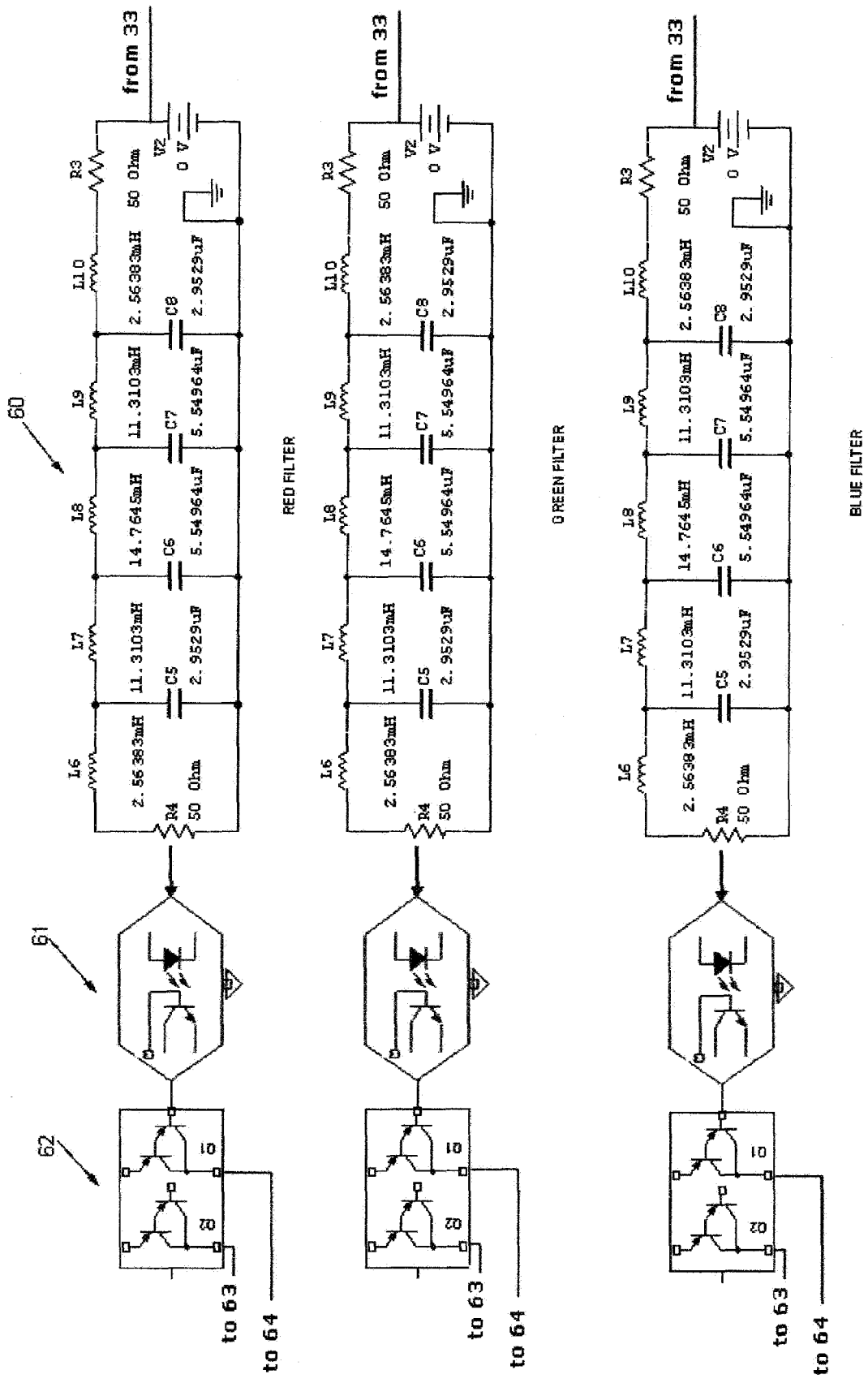

In FIG. 5, shows a detailed view of the induction circuitry from FIG. 4.

Figure 6:
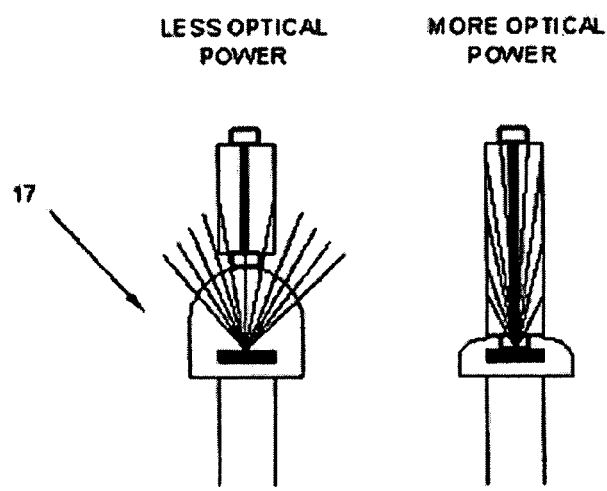

In FIG. 6, the adoption of the lens of the light emitting diode is detailed.

Figure 7:
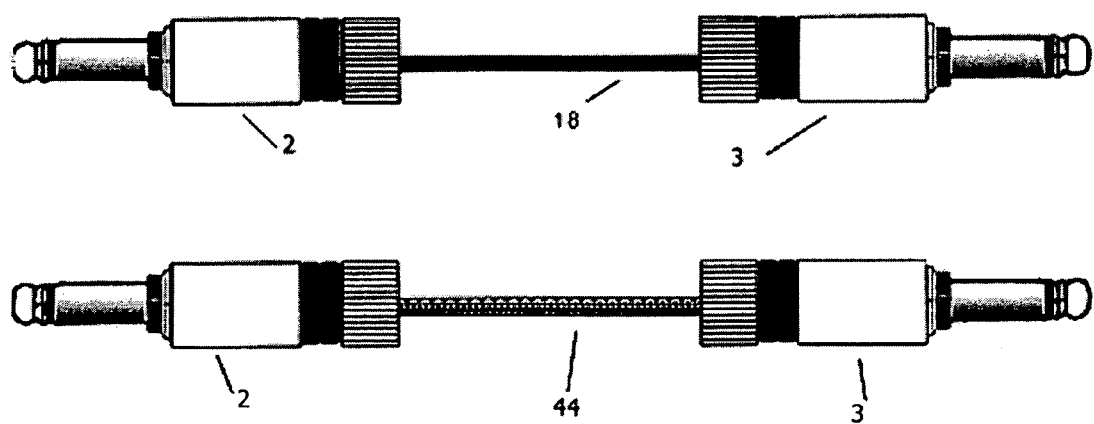

In FIG. 7, shows a completed cable, one cable being an audio only cable as described in FIG. 1 and the other cable being a trichromatic cable having both audio and bounce circuitry included, as described in FIG. 3.

DETAILED DESCRIPTION OF THE INVENTION

As previously stated, the field of this invention is the transmission of analog sounds over distances using fiber-optic cables. The use of this technology is limited only by the imagination. The best mode for this invention will be described in the context of a guitar cord, connecting an electric guitar or a guitar with electronic pickups to an amplifier or similar device that will amplify, record or alter the sounds produced by the guitar.

Guitar cord 1 is constructed such that there are two termination points, input phono jack 2 and output phono jack 3. The invention is broken down into two main sections, the transmitting section, in phono jack 2, and the receiving section, in phono jack 3, connected by a transmission channel. The phono or mono jacks that are used today are also referred to as ¼" military style plugs. Unlike prior art guitar cords that use solid core or stranded wire, where either end can be used for either the input or output sides, cord 1 possess unique termination ends that are not interchangeable.

Sound produced by the guitar is transferred into electrical energy by the use of the pickup board on the guitar, which contains a series of magnets wound with fine wire, placed under the guitar string. The motion or vibration of the ferrous guitar string near the pickup coil magnets change the magnetic flux of the magnet creating an electrical current. It is in this form that the analog sound or note that the player of the electric guitar has created by causing the guitar string to vibrate at a particular resonance, is changed from an audible sound to electric current. Sound produced by an electric guitar can range or modulate in a bandwidth from 1 Hz (just below human audible range) to over 20 KHz. The higher the frequency the more electric current is created. Electric current is generated, via the Faraday Effect, which is directly related to the frequency that the guitar string has generated audibly and varies with each note played. Electric current is transferred from input jack 2 to audio input 10. Audio input 10 is the means for inputting sound into the invention. In this case, input jack 2 is used from the guitar, but this invention would be able to accept the input of audio from a variety of sources such as radios, microphones and the like, so long as the audio is presented into audio input 10 as a stream of electrical current.

Audio input 10 is connected to an electronic backflow device in the form of blocking capacitor 111 whereby any stray electromagnetic fields generated by the cord due to the presence of electrical current will be prevented from entering back into input jack 2. This backflow of induction current could harm the guitar and could also cause opposing voltages traveling along the same wire. Generally, output voltage from an electric guitar is between 0 and 1 volt peak-to-peak.

Other audio devices that produce more than 1V peak to peak would need either to reduce the output voltage or the device disclosed would need modified to accept a higher current.

Current allowed past blocking capacitor 11 enters into high speed amplifier circuit 4 whose purpose is to shape the current into voltage useable by the rest of the circuit. Blocking capacitor 11 provides the means to prevent backflow of DC current from potentially damaging the device attached to input jack 2 and maintain clean sinusoidal AC signals. In this case, circuit 4 is often called an operational or op amp circuit which is the means for changing current into appropriate voltage levels. Circuit 4 contains feedback resistor 13, gain resistor 14, biasing resistor 15 and amplifier 12. Feedback resistor 13 works to keep the differential input voltage between the positive and negative pins or rail of amplifier 12 very small by feeding the output of amplifier 12 back into the negative input side which keeps the output of amplifier 12 within it's linear range or parameter. Gain resistor 14 works in parallel with feedback resistor 13 to form a gain circuit, where gain of the circuit is measured by feedback resistor 13 divided by gain resistor 14. Gain circuit with the feedback resistor feeding back into the negative side of amplifier 12 will also invert the signal, creating an inverted output voltage as the negative input is driven by the output voltage. Positive pin of amplifier 12 is tied to ground through biasing resistor 15 which allows the system to run at 50% of applied voltage or close to the ground potential, midway between the input voltage from biasing resistor 15 and signal input voltage from gain resistor 14. In this embodiment using an electric guitar, the 50% or midpoint threshold, would be 0.5V. In this case, lamp 17 will always be energized at 0.5V and changes in frequency from the guitar will be lower or higher than 0.5V or than the 50% normal energy supplied. This reduction of power allows this invention to be used with Class A amplifiers and provides for the lowest amount of noise and distortion possible. This also allows for faster slewing speeds as the signal is only changing ½ of the voltage signal, between the maximum of 1V to the minimum of 0V. Once the signal is delivered, lamp 17 is changing back to 50% of the applied voltage, or in this embodiment 0.5V, preparing for the next slewed signal. For example if one voltage is 0.7V and the next is 0.3V, the system needs only to change for 0.5V to 0.7V and then back to 0.5V then to 0.3V. This allows the system to change only 0.2V between the first and the second signal, as the system is at "rest" at 0.5 V between the two signals. This ability, to be at rest at 0.5V, is due to the biasing resistor 15. This change from 0.7V to 0.3V is accomplished more quickly as it is only a change of 0.2V from the first to the second signal rather than the system to be at 0 V between signals. There are various means for producing this resistance including a variable resistor. Because of this biasing, in the invention, the maximum difference between the input voltage on the negative pin of the op amp and the supplied voltage to the positive pin of the op amp will only be 0.5 V. It is imperative that the slew rate of the amplifier 12 be at least 3000v/μs to transmit the clearest sound through circuit 4. The higher the slew rate, the better the amp is at potentially reproducing the all subtle nuances and dynamics associated with music reproduction.

Voltage signal emanating from the output of amplifier 12 is softened by resistor 16 which will regulate the voltage passed to lamp 17 to prevent damage to lamp 17 due to high voltage when the guitar or input device reaches maximum volume or voltage. Characteristics of lamp 17 are such that it will accept low voltages, provide an acceptable spatial radiation pattern, and be capable of emitting light within the visible spectrum and beyond into the range of approximately 1100 nanometers of wavelength. In this invention, the means for producing electro-optical radiation is a Light Emitting Diode or LED, due to small size, low voltage requirements which increase the safety of the invention, and is capable of emitting light in both the visible and non-visible spectrums. Another beneficial property of the LED is that spatial radiation pattern is very narrow, between 6 to 20 degrees, which means that the beam of light emitting from the LED is concentrated into a narrow conically shaped pattern. This differs from columnated beams, such as lasers, which would not refract as well about the interior of the transmission channel. This does not preclude the use of a columnated beam, such as a laser, rather a better light properties are presented with light emitting diode style of conically shaped light patterns. Incandescent lamps used in prior art, whose spatial radiation pattern is closer to 180 degree produces large amount of wasted energy in the form of light than can be adapted to the interior of the transmission channel. Incandescent lamps also use up to 20 times the power required of light emitting diode lamps. Lamp 17 in this application should be able to produce light in the range between 400-1100 nanometers with the higher wavelengths being able to produce a higher degree of spectral responsivity in the receiving device. In this invention, 470-850 nanometers were typically used. Light in the visible spectrum may enhance the aesthetics of this invention. Lamp 17 is adapted for optimal transmission through the activity of reducing the curvature of the lens of the LED such that the distance from the diode medium to the transmission channel is minimized, such that the greatest majority of the spatial radiation pattern is contained within the transmission channel. This is best shown in FIG. 6. In this application, the transmission section terminates to ground after lamp 17.

Transmission channel 18 is the means whereby light or energy emitted by lamp 17 is transmitted from phono jack 2 to phono jack 3. In this application, optical fiber is used, either fluorescent or scintillating in nature, though the selection of these two types of optical fibers does not limit the scope of this application. Scintillating fibers produce photons in different color ranges when the fiber is subjected to high-energy particles emitted by lamp 17 while fluorescent molecules in the fluorescent fibers absorb light and then emit light at a longer wavelength than absorbed. The light emitted is narrow-wavelength, vivid and bright as the energy from lamp 17 ignites or fluoresces the fiber optic channel. The colors emitted are based on the LED and type of fibers used and are selectable by the user. In this invention, FIGS. 2,3, and 4 show that blue florescent fiber optic are used. FIG. 6 shows the relation between lamp 17 and channel 18 so that maximum efficiencies of light energy are maintained. FIG. 6 shows the relation between lamp 17 and channel 18 so that maximum efficiencies of light energy are maintained. LED 17 normally has a convexly shaped dome protecting the actual light emission source. In this invention, the dome is reduced so that a flat top is barely covering the light emission source thereby reducing the distance from the opening and interior channel of the fiberoptic cable to the light emitting source of the LED reducing the amount of light energy that would have been directed outside of, or would have escaped from the interior channel of the cable. Channel 18 is encapsulated within outer protective cover 27. Cover 27 has an interior core and an exterior jacket. The exterior jacket of cover 27 serves to protect the transmission channel 18 from damage and abrasion from use, and also serves as a strain relief protecting the connection between lamp 17 and channel 18. Cover 27 also encapsulates any power and ground wires needing to be run from phono jack 2 to phono jack 3. Power source 28 is a 5V power supply that supplies 5 VAC, powering the invention with the voltage necessary but can be supplied from external sources or from the actual amplifier into which phono jack 3 connects. It is preferable that the power supply be able to supply both AC and DC low voltages. Additional power may be necessary to power multiple strands of different colors, but additional power is only necessary on the DC side of the power supply. It is an important safety feature of this invention to keep the power requirement, especially on the AC side, as low as possible, promoting the highest level of safety possible. Power wire 29 and ground wire 26 are also encapsulated with channel 18 in the interior of cover 27. In this invention, clear vinyl tubing is used so that any color emitting will not be altered. An alternative source of power could be supplied by an N cell or equivalent battery that would be located inside of phono jack 2 and jack 3. An embodiment of this invention includes the presence of shielding 19, which would also serve to encapsulate channel 18 and any power wires present. In this invention, shielding 19 is a length of heat shrinkable tubing. This protection of shielding 19 would reduce the chance of the transmission of the audio signal generated could interfere with or be interfered by, surrounding electronic equipment, or itself be influenced by magnetic or electrical fields since the application of the invention using guitar cords would possibly necessitate multiple electrical cords in close proximity to one another. Another method of shielding 19 is the cladding of the fiber optic cable.

The signal that is propagated through transmission channel 18 is received and processed by a photodiode that is connected to a transimpedance amplifier, creating the receiver 20. Receiver 20 creates an output voltage which increases linearly with light intensity received by the photodiode. It is preferable that the transimpedance amplifier means is used that include a large feedback resistance to achieve the best signal to noise ratio, where the resistance also increases linearly with the responsitivity of the photodiode. Receiver gain is adjusted by presence of receiver gain resistor 21 whose gain is set such that signal input into amplifier 12 is reproduced fully upon the exit of receiver 20. Voltage supply to receiver 20 contains DC blocking capacitor 22 blocking harmful DC current from harming the amplifier and from distorting the value of the signal emanating from receiver 20. Capacitor 23 is inline from the output of receiver 20 prior to the connection with audio output 24. Capacitor 23 will not allow any transient DC voltage from entering audio output 24. The means for the audio output 24 in this invention is output phono jack 3 which plugs directly into an amplifier (not shown) or other device which will process the signal that have emanated from phono jack 2. Both capacitor 23 and blocking capacitor 22 are safety features not found in other prior art devices that deal with both AC and DC power supplies. Specific pieces of electronic circuitry and sound producing equipment that are used in this invention and their associated currents should not be allowed to permeate this circuitry, as they will harm the components if allowed to proceed unimpeded.

An embodiment of this current invention uses the voltages supplied by receiver 20 to create a visual light display as shown in FIG. 3, whereby the light intensity is synchronized with the audio sound intensity. The means for this synchronization is the bounce circuit which interfaces with receiver 20 so that the audio and light signals are processed simultaneously in the different circuits. It would be desirable to have a device that is able to change the intensity of light along a prescribed path using voltages between 5-10VDC decreasing power consumption and increasing safety to the user. It would be desirable to have a device that uses analog signals throughout the circuitry, thus reducing added costs for conversion circuitry, and providing 100% modulation as the analog signal is not filtered or modulated electronically. Capacitor 30 acts as capacitor 23. Capacitor 30 is inline between receiver 20 and amplifier 33, whereby capacitor 30 prevents the flow of any DC voltage from the visual lights into the audio output 24. Circuit 5 consists of components similar to circuit 4 whereby voltage that is output from receiver 20 is changed into a current based on the level of input voltage as voltage and current are linearly related. Gain resistor 32 functions with feedback resistor 31 to create the gain circuitry desired to regulate the level of current supplied to the rest of the circuitry. Feedback resistor 31 also connects the output of amplifier 33 to the negative pin of amplifier 33 so as to create a voltage feedback loop keeping the current output between the supply rails of amplifier 33. Positive pin of amplifier 33 is connected to a biasing resistor 34, which adjusts the sensitivity of the output, whereby the AC power supplied is reduced or biased to be 50% of peak power. This reduction of power allows this invention to be used with Class A amplifiers and provides for the lowest amount of noise and distortion possible. Feedback resistor 31 also keeps the difference between the biased input voltage to the positive pin of amplifier 33 and the voltage from the receiver 20 to the negative pin of amplifier 33 to be minimalized. Current created by circuit 5 is prevented from backfeeding the rest of the circuitry by block 30. Block 30 is an added safety device not found in the prior art whereby harmful DC voltages are kept away from the low voltage AC circuitry and those device attached to this invention. Another safety feature of the current invention not found in the prior art is the addition of optocoupler 36. Optocoupler 36 presents a means for isolating the delicate circuitry that regulates the power output to the audio signal from the light circuitry which can run at a high current. In this invention, optocoupler 36 is an optoisolater using a light emitting diode with a photo-transistor output that physically creates an one-way separation preventing any light or voltages from reflecting back down causing feedback issues. As optocoupler 36 is a sensitive device, resistors 35 and 46 form a "cushioning" effect preventing large voltage spikes, such as audio output extremes providing maximum voltages, from damaging the optocoupler by reducing the surge. Optocoupler 36 is in-line between amplifier 33 and light power circuit 7. Inline with digital ground 37 and the output of octocoupler 36 is blocking capacitor 45, whose purpose is to prevent any spurious DC current from effecting any of the components. It is desirable in this invention to create circuitry whereby stray or spurious currents and voltages are always kept away or removed from the circuitry, reducing the chance of harm to the delicate circuitry or those devices attached to this invention.

Light power circuit 7 consists of power sharing inverted Darlington transistors. In this invention, 2 Bi-Polar PNP Darlington transistors 39 and 40 are used in parallel to share the power reducing the power input needs of the circuit increasing user safety. Light power circuit 7 creates very high current gain and high impedance while using very little input current. It is preferable that the power supply be able to supply both AC and DC low voltages. Additional power may be necessary to power multiple strands of different colors, but additional power is only necessary on the DC side of the power supply. The DC power 38 is supplied from power supply 28 and can range from 5-6 VDC depending on the color desired by the user which red color requiring the least voltage and blue and green requiring the higher voltages. In this invention, only three colors were developed but this does not limit the range of colors available or limit the scope of this invention to only specific colors or combination of colors. With the advent of the need for DC power, the circuit also introduces digital ground 37 which isolates any noise created by the light circuitry from interfering with the analog or audio signal. Outputs of transistors 39 and 40 are electrically linked to bounce circuit 8.

Bounce circuit 8 consists of light emitting diodes in two banks, start bank 41 and return bank 42. In this invention, start bank 41 consists of up to 3 light emitting diodes in series with a braking resistor 43 subsequently in line with start bank 41. Braking resistor 43 has the duty of briefly slowing the current to start bank 41, so that return bank 42 which is located at the opposing end of bounce cable 44, will be energized at approximately the same instant. Bounce circuit 8 derives its power in the form of voltage that is representative of the original audio signal that was received by audio input 10. In one embodiment of this invention, the 3 light emitting diode in start bank 41 are the same color. The intensity of the color produced by the light emitting diodes in start bank 41 and return bank 42 will change with the intensity of the audio sound. The louder the sound, the brighter the light. There is no limit to the intensity of colors that can be created nor is this invention limited any particular number of light emitting diodes, it is the power consumption of the light emitting diode that limit the number of diodes. Light emitting diodes producing between 470 and 690 nanometers can be used to produce visible light while lower wavelengths can be used for special effects, such as being used in conjunction with black lighting. The lens of each light emitting diode in start bank 41, has been adapted by grinding or similar action designed to reduce the curvature and height so that the greatest amount of the spatial radiation pattern of the light emitting diode is captured inside of bounce cable 44, the results of this process is seen in FIG. 6. Bounce cable 44 contains at least one fiber optic cable, which can be fluorescent optical fibers or fiber optic cable without fluorescent capabilities, for each light emitting diode present in start bank 41. Bounce cable 44 is routed through the interior core of cover 27 along with the audio portion of this invention. Return bank 42 contains at least one light emitting diode, appropriately adapted for maximum spatial radiation pattern in the interface with one or more fiber optic cables in bounce cable 44.

Another embodiment, shown in FIG. 3, of this invention is the enhancement of bounce cable 44 to display multiple colors. In this embodiment, light power circuit 7 is electrically connected to bounce circuit 8 whereby each of the light emitting diodes in start bank 50 create a different spectrum of light and return bank 51 have a representative diode of similar light characteristics attached to the same fiber optic cable in bounce cable 44. Subsequent to each light emitting diode, resistance or inductance is added to control the amount of light emitted so each color shines with the same intensity. In this invention, a red colored light emitting diode is reduced in intensity by resistor 52 as it only requires 5VDC to maintain the intensity required. Green and Blue light emitting diodes, which require 6VDC to maintain the intensity required have no resistance in the circuitry but have inductors 53 and 54 respectively, which allows DC current to flow and blocks any stray high frequency AC. Return bank 51 has light emitting diodes of similar characteristics of those on start bank 50. Resistor 55 is placed subsequent to the Red light emitting diode as on start bank 50, and inductors 56 and 57 are placed prior to the Green and Blue light emitting diodes. This gives bounce cable 44 a multi-color appearance, with each color changing in intensity with the audio signal input.

Another embodiment of this invention is shown in FIG. 4, which introduces induction circuitry. There are several instances of prior art, where analog signals are filtered into different frequencies, so that a particular frequency will display a particular light. As the sound progresses, series of different lights turn off and on as the sound frequency changes. These filters are made of circuits of resistors and diode and amplifiers which "cut-off" or dampen the response to frequencies of sounds produced, allowing only a filtered signal through. This effects the modulation of the original sound. This embodiment of the current invention uses induction, thereby inducing a frequency response based on the voltage present. FIG. 5 shows a detail of this induction circuit shown in block form on FIG. 4. This is a passive induction which responds to different frequencies rather than an active filtering that aggressively reshapes the sound wave to conform to the circuit coloring parameters. This embodiment differs from that shown in FIG. 3 as using this passive induction circuitry, the separate colors are capable of differing intensities, whereas previously disclosed, all colors had the same intensity. In this embodiment it is possible to have a single color to have a different intensity based on the responsivity of that particular color to the applied induction circuitry. As current changes through inductors, large amounts of voltage are created. Each bank of the induction circuit 60 has a corresponding light color associated therewith, allowing the light emitting diodes 63 and 64 to jointly increase in intensity with the increasing current applied. In this embodiment of the current invention, induction bank 60 responds to changes in current which is output from amplifier 33, creating a color scheme based on the complete audio signal, not just filtering part of the audio signal. As induction works with current change, it is not as fast as the filtering process, but the speed of the filtering systems must be regulated or timed, so that the color do not change so quickly that the user receive just a blur of colored light. As the audio signal changes as a guitar is played, the colors will change in real time based on based the inherent timing function of the induction circuit. In this embodiment, each color has it's own optical isolator 61, as each color's intensity is independent of each other. Power passed through isolator 61 is received by an unique Dual Darlington Power transistor 62 where one transistor's emitter leg powers a light emitting diode 63 and the other transistor's emitter leg power diode 64 at the opposite end of the bounce cable.

It is obvious that the components named in the best mode of practicing this invention are capable of replacement by those other components that perform similar functions. Though the best mode of this invention is it's application to guitar cords, any form of audio analog input will function within this invention, whereby a bundle of cable that are capable of refractivity, with or without an element that increases or facilitates luminance's, will become saturated with light which varies in intensity with the amplitude of the sound.

What is claimed is:

1. A method for transmitting analog audio signals using electro-optic radiation without degradation of modulation further comprising;

powering circuit with low-voltage alternating current,
   receiving an analog signal from a device creating differentiating current,
   blocking to prevent backflow of current and to protect circuitry from voltage spikes,
   biasing voltage from said powering circuit input into operational amplifier,
   slewing changes in analog current levels into discrete voltage levels while using capacitance to maintain sinusoidal signal,
   controlling output within linear range of circuit using feedback,
   adjusting gain of voltage output through use of feedback and gain resistors,
   softening power to protect against said voltage signal from being outside of supply rail parameters of operational amplifier, converting electrical voltage into electro-optic radiation by using a diode, adapting said diode to transmit electro-optic radiation by transforming covering of diode to a flatness that will accept opening in transmission channel, transmitting electro-optic radiation through said transmission channel, receiving and amplifying electro-optic radiation whereby output voltage modulates linearly with intensity of electromagnetic radiation, adjusting gain while increasing responsivity, reamplifying voltage from said receiving and amplifying step, biasing voltage, isolating AC voltage from DC power circuits, while transferring voltage values through photo-transistor output, increasing voltage through Darlington pair circuitry, creating electro-optical radiation corresponding in strength to applied voltage, igniting florescent fiber optics using said electro-optical radiation and sending analog signal to output device.

2. Apparatus for transmitting analog audio signals, and producing light whose intensity is based on the amplitude of the input analog audio signal, using electro-optic radiation without degradation of modulation comprising;

means for receiving audio signals where said audio has been converted to electrical current as the determining factor for bandwidth modulation between less than 1 Hz to more than 20 KHz, means for supplying electrical power to various circuits, means for blocking and preventing backflow of current and to protect circuitry from spikes in voltage system and personnel safety with low voltage high amperages, means for conversion of said audio signals to voltage, means for biasing power received from said electrical power means, means for generating electro-optical radiation using said voltage supplied by said conversion means into said radiation, means for transmitting said radiation over distances where said radiation is uniformly reflected with negligible transmission loss, means for transimpendance amplification of said transmitted radiation linearly increasing voltage in response to said radiation, means for outputting electrical current to device that processes said audio signal, and means for synchronizing the creation of light whereby said light varies in intensity with said audio signal amplitude in real time where said means for synchronizing the creation of light further comprises; light emitting diodes, opto-couplers, amplifier, Darlington pair, safety devices, and collection of fiber optic cables, and wherein an opto-coupler separates high current DC circuitry from low voltage AC circuitry, and is preceded inline by said amplifier and is located subsequent to Darlington Pair.

3. Apparatus of claim 2 for transmitting analog audio signals, and producing light whose intensity is based on the amplitude of the input analog audio signal, using electro-optic radiation without degradation of modulation where biasing means are adjusted for 50% of power to normalize current into phases of over 50% and under 50%.

4. Apparatus of claim 2 for transmitting analog audio signals, and producing light whose intensity is based on the amplitude of the input analog audio signal, using electro-optic radiation without degradation of modulation where said radiation is about 400-800 nanometers in the wavelength.

5. Apparatus of claim 2 for transmitting analog audio signals, and producing light whose intensity is based on the amplitude of the input analog audio signal, using electro-optic radiation without degradation of modulation where at least one said light emitting diode, which receives voltage from Darlington Pair, is located at each termination of a collection of fiber optic cables.

6. Apparatus of claim 5 for transmitting analog audio signals, and producing light whose intensity is based on the amplitude of the input analog audio signal, using electro-optic radiation without degradation of modulation where said fiber optic cables are energized by light emitting diodes that are similar in color generated.

7. Apparatus of claim 5 for transmitting analog audio signals, and producing light whose intensity is based on the amplitude of the input analog audio signal, using electro-optic radiation without degradation of modulation where said fiber optic cables are energized by light emitting diodes that are different in color generated.

8. Apparatus of claim 7 for transmitting analog audio signals, and producing light whose intensity is based on the amplitude of the input analog audio signal, using electro-optic radiation without degradation of modulation where voltage applied to each color is induced by varying magnetic flux of said audio signal.

9. Apparatus of claim 7 for transmitting analog audio signals, and producing light whose intensity is based on the amplitude of the input analog audio signal, using electro-optic radiation without degradation of modulation where voltage applied to each color is directly related to voltage of said audio signal.

10. Apparatus of claim 2 for transmitting analog audio signals, and producing light whose intensity is based on the amplitude of the input analog audio signal, using electro-optic radiation without degradation of modulation where said amplifier receives input voltages from said means for transimpendance amplification of said transmitted radiation.

* * * * *